United States Patent
Fukano et al.

(10) Patent No.: US 6,755,354 B2
(45) Date of Patent: Jun. 29, 2004

(54) SUCK BACK VALVE

(75) Inventors: Yoshihiro Fukano, Moriya (JP);
Tadashi Uchino, Moriya (JP)

(73) Assignee: SMC Kabushiki Kaisha, Tokyo (JP)

(*) Notice: Subject to any disclaimer, the term of this patent is extended or adjusted under 35 U.S.C. 154(b) by 0 days.

(21) Appl. No.: 10/373,026

(22) Filed: Feb. 26, 2003

(65) Prior Publication Data

US 2003/0178504 A1 Sep. 25, 2003

(30) Foreign Application Priority Data

Mar. 6, 2002 (JP) ........................................ 2002-060085

(51) Int. Cl.[7] .......................... B05B 15/02; B05B 1/30; F23D 11/34; F23D 11/38; F23D 14/50
(52) U.S. Cl. .................. 239/119; 239/106; 239/586; 239/73; 251/63.5; 251/331; 222/571
(58) Field of Search .......................... 239/119, 106, 239/586, 73, 71; 251/63.5, 331, 5, 30.02, 129.15, 121; 222/571

(56) References Cited

U.S. PATENT DOCUMENTS

| | | | | |
|---|---|---|---|---|
| 4,403,764 A | * | 9/1983 | Repplinger ..................... | 251/5 |
| 5,918,810 A | * | 7/1999 | Fukano et al. .............. | 239/119 |
| 5,927,605 A | * | 7/1999 | Odajima et al. ............ | 239/119 |
| 5,931,384 A | * | 8/1999 | Fukano et al. .............. | 239/119 |
| 5,938,119 A | * | 8/1999 | Yamada et al. ............. | 239/119 |
| 5,950,923 A | * | 9/1999 | Fukano et al. .............. | 239/119 |
| 5,950,924 A | * | 9/1999 | Hatakeyama et al. ....... | 239/119 |
| 5,967,414 A | * | 10/1999 | Fukano et al. .............. | 239/119 |
| 5,971,296 A | * | 10/1999 | Fukano et al. .............. | 239/119 |
| 5,979,792 A | * | 11/1999 | Fukano et al. .............. | 239/119 |
| 5,988,524 A | * | 11/1999 | Odajima et al. ............ | 239/119 |
| 6,000,629 A | * | 12/1999 | Tamura et al. .............. | 239/119 |
| 6,176,438 B1 | * | 1/2001 | Sato et al. .................. | 239/119 |

FOREIGN PATENT DOCUMENTS

| | | |
|---|---|---|
| JP | 56-131870 | 10/1981 |
| JP | 63-163077 | 7/1988 |
| JP | 6-47092 | 6/1994 |

* cited by examiner

Primary Examiner—Michael Mar
Assistant Examiner—Darren Gorman
(74) Attorney, Agent, or Firm—Paul A. Guss (57) ABSTRACT

A suck back valve has a volume-varying mechanism including a cylindrical flexible member which has a flow chamber formed therein for communicating with a fluid passage having a first port and a fluid passage having a second port, a fixing member which fixes a part of the outer circumferential surface of the cylindrical flexible member to a joint section, and a hook member which increases the volume of the flow chamber by expanding and deforming the outer circumferential surface of the cylindrical flexible member.

8 Claims, 9 Drawing Sheets

PRIOR ART

SUCK BACK VALVE

BACKGROUND OF THE INVENTION

1. Field of the Invention

The present invention relates to a suck back valve which makes it possible to avoid, for example, a liquid drip at a supply port for a pressure fluid by sucking a predetermined amount of the pressure fluid flowing through a fluid passage.

2. Description of the Related Art

A suck back valve has been hitherto used, for example, in the production process of semiconductor wafers or the like. The suck back valve functions to avoid the so-called liquid drip which would otherwise occur such that a minute amount of a coating liquid drips toward the semiconductor wafer from a supply port when the supply of the coating liquid to the semiconductor wafer is stopped.

Figure 9:
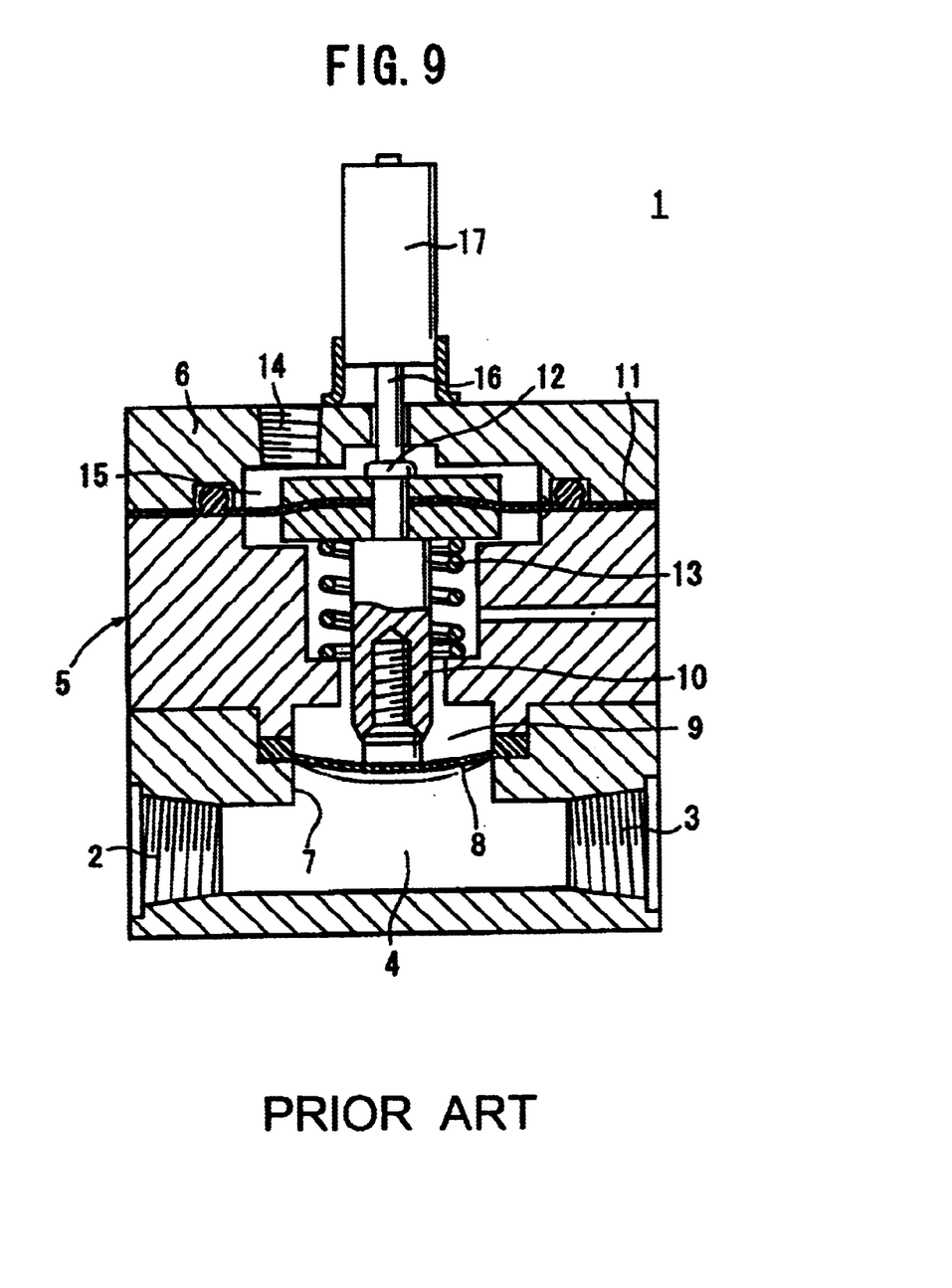
FIG. 9 is a vertical sectional view illustrating a conventional suck back valve.

A conventional suck back valve is now shown in FIG. 9 (see Japanese Patent Publication No. 6-47092).

The suck back valve 1 has a main body 5 which is formed with a flow chamber 4 for communicating with an inflow port 2 and an outflow port 3, and a cover 6 which is connected to an upper portion of the main body 5. The inflow port 2 is connected to a liquid supply source (not shown), while the outflow port 3 is connected to an unillustrated nozzle.

An opening 7, which extends upwardly, is formed at a substantially central portion of the flow chamber 4. A first diaphragm 8, which partitions the upper surface of the flow chamber 4 in an air-tight manner, is stretched over the opening 7. A vertically movable member 10, which has the lower end to abut against the first diaphragm 8, is arranged in a chamber 9 which is formed over the first diaphragm 8.

A second diaphragm 11, which is interposed between the main body 5 and the cover 6, is arranged at an upper portion of the vertically movable member 10. The second diaphragm 11 is caulked to the end of the vertically movable member 10 so that the second diaphragm 11 is displaced together with the vertically movable member 10 by a projection 12 which is secured to the second diaphragm 11.

A coil spring 13 urging the second diaphragm 11 upwardly is installed between the first diaphragm 8 and the second diaphragm 11. A pressure chamber 15, to which the pilot air is supplied via a pilot air port 14, is formed between the second diaphragm 11 and the cover 6. The cover 6 is provided with a detecting unit 17 comprising a detecting pin 16 which abuts against the projection 12 of the vertically movable member 10.

The operation of the conventional suck back valve 1 will be schematically explained. The pilot air is supplied from an unillustrated electropneumatic proportional valve to the pilot air port 14 of the pressure chamber 15. The pressure chamber 15 has a high pressure during the supply of the liquid. The pressure overcomes the spring force of the coil spring 13, and the second diaphragm 11 is placed at a downward position as shown by a two-dot chain line in FIG. 9. The first diaphragm 8, which is operated together with the vertically movable member 10, is also placed at a downward position, and thus the volume of the flow chamber 4 is decreased.

When the liquid supply source is deenergized to stop the discharge from the nozzle, then the pilot pressure, which is supplied from the pilot air port 14, is reduced, and the pressure in the pressure chamber 15 is lowered. Therefore, the first diaphragm 8 is moved upwardly together with the second diaphragm 11 and the vertically movable member 10, to a position shown by a solid line in FIG. 9. As a result, the first diaphragm 8 is deformed, and the volume of the flow chamber 4 is increased. Accordingly, the liquid in the nozzle is sucked.

In this case, the deformation of the first diaphragm 8 corresponds to the vertical motion of the vertically movable member 10, which is detected as the movement of the detecting pin 16 of the detecting unit 17. A detection signal from the detecting unit 17 is sent to an unillustrated instructing unit to perform feedback control.

However, in the conventional suck back valve 1 described above, the liquid remaining in the nozzle is sucked by deforming (bending) the first diaphragm 8 to increase the volume of the flow chamber 4. Liquid may be pooled as the first diaphragm 8 is deformed, around the opening 7 at which the circumferential edge of the first diaphragm 8 is interposed. Further, the dust contained in the liquid and the dust in the nozzle may be accumulated around the opening 7 by the sucking action of the first diaphragm 8.

Further, in the conventional suck back valve 1, the suction amount of the liquid is set based on the amount of deformation of the first diaphragm 8. However, it is impossible to set a minute suction amount in the conventional suck back valve 1. If a minute suction amount would be set, it is necessary that the aperture of the opening 7 to which the first diaphragm 8 should be formed as small as possible in order to decrease the amount of displacement of the first diaphragm 8. However, the reduction of the aperture diameter of the opening 7 is limited in view of the production of the vertically movable member 10, the first diaphragm 8, or the like.

SUMMARY OF THE INVENTION

A general object of the present invention is to provide a suck back valve which makes it possible to avoid, for example, the appearance of liquid pool and the accumulation of dust.

A principal object of the present invention is to provide a suck back valve which makes it possible to set a minute suction amount.

According to the present invention, a stretching member is displaced together with a displaceable member. The outer circumferential surface of a flexible member is stretched and deformed by the stretching member, and thus the volume of a flow chamber can be increased. Therefore, negative pressure action is brought about as the volume of the flow chamber is increased, and the pressure fluid in a flow passage is sucked.

In this arrangement, the flow chamber communicating with a first port and a second port of the fluid passages is formed in the flexible member. The flexible member is positioned deformably between the fluid passages. Therefore, even when the flow chamber is increased or decreased in volume, it is possible to avoid the appearance of liquid pool and the accumulation of dust or the like.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
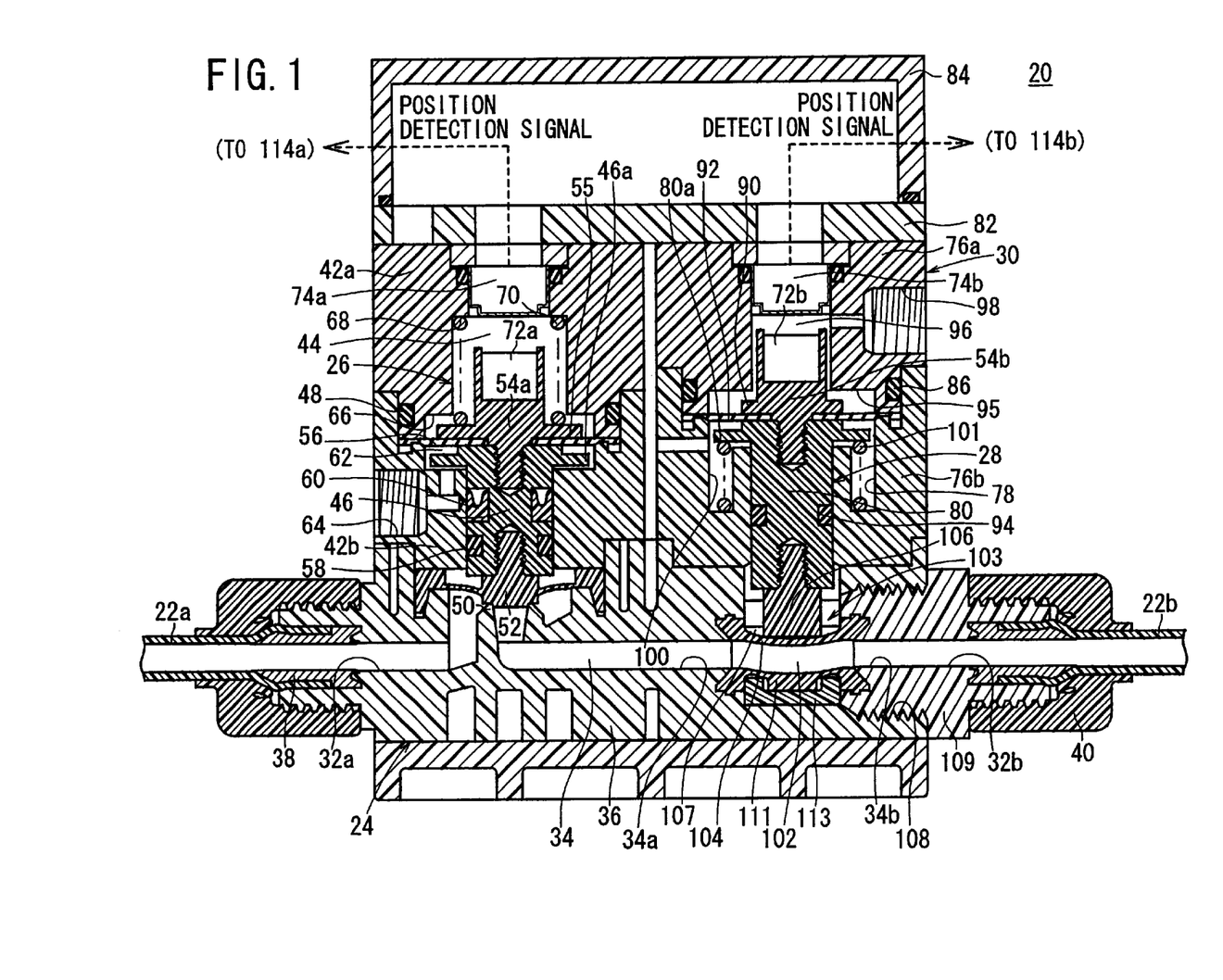
FIG. 1 is a vertical sectional view illustrating a suck back valve according to an embodiment of the present invention.

With reference to FIG. 1, reference numeral 20 indicates a suck back valve according to an embodiment of the present invention. The suck back valve 20 comprises a joint section 24 to which a pair of tubes 22a, 22b are detachably connected while being spaced from each other by a predetermined distance, and a valve-driving section 30 which is provided on the joint section 24 and which includes an ON/OFF valve 26 and a suck back mechanism 28 therein.

The joint section 24 includes a joint body 36 which has a first port 32a at one end and a second port 32b at the other end and which is provided with a fluid passage 34 for communicating with the first port 32a and the second port 32b, inner members 38 which are engaged with the first port 32a and the second port 32b respectively and which are inserted into openings of the tubes 22a, 22b, and lock nuts 40 which are screwed in screw grooves engraved on ends of the joint body 36 to retain liquid-tightness or air-tightness at the connecting portions of the tubes 22a, 22b.

The ON/OFF valve 26 is arranged on an upper portion of the joint section 24 disposed closely to the first port 32a. The ON/OFF valve 26 includes a first upper valve body 42a and a first lower valve body 42b which are connected to the joint body 36, and a first piston 46 which is arranged in a first chamber 44 formed in the first upper valve body 42a and the first lower valve body 42b and which is provided displaceably in the vertical direction. A first seal member 48 is installed to the connecting portion between the first upper valve body 42a and the first lower valve body 42b. The air-tightness in the first chamber 44 is retained by the sealing function of the first seal member 48.

When a valve plug 52 is seated on a seat section 50, the valve plug 52 closes the fluid passage 34. The valve plug 52 is screwed at one end of the first piston 46 in the axial direction. The valve plug 52 comprises a thick-walled section which is disposed at a central portion and a thin-walled section which is integrally formed at the periphery of the thick-walled section. A first connecting member 54a is fastened to the other end of the first piston 46 in the axial direction through a screw section. A first diaphragm 56 is interposed at the connecting portion between the first piston 46 and the first connecting member 54a. The first diaphragm 56 is flat plate-shaped. The circumferential edge of the first diaphragm 56 is interposed between the first upper valve body 42a and the first lower valve body 42b. An O-ring 58 and a packing 60 having a V-shaped cross section are installed to annular grooves on the outer circumferential surface of the first piston 46 respectively.

A cylinder chamber 62, which is closed by the first diaphragm 56 in an air-tight manner, is formed under the first diaphragm 56. The pressure fluid is supplied into the cylinder chamber 62 via a first pressure fluid inlet/outlet port 64 which is communicated with the cylinder chamber 62. The pressure fluid acts on a flange section 46a which is formed at an upper portion of the first piston 46 to press the first piston 46 upwardly. Therefore, when the first connecting member 54a, the first piston 46, and the valve plug 52 are moved all together upwardly when the first diaphragm 56 is bent, the valve plug 52 is spaced from the seat section 50 to switch from a valve-closed state to a valve-opened state (see FIG. 7).

Figure 7:
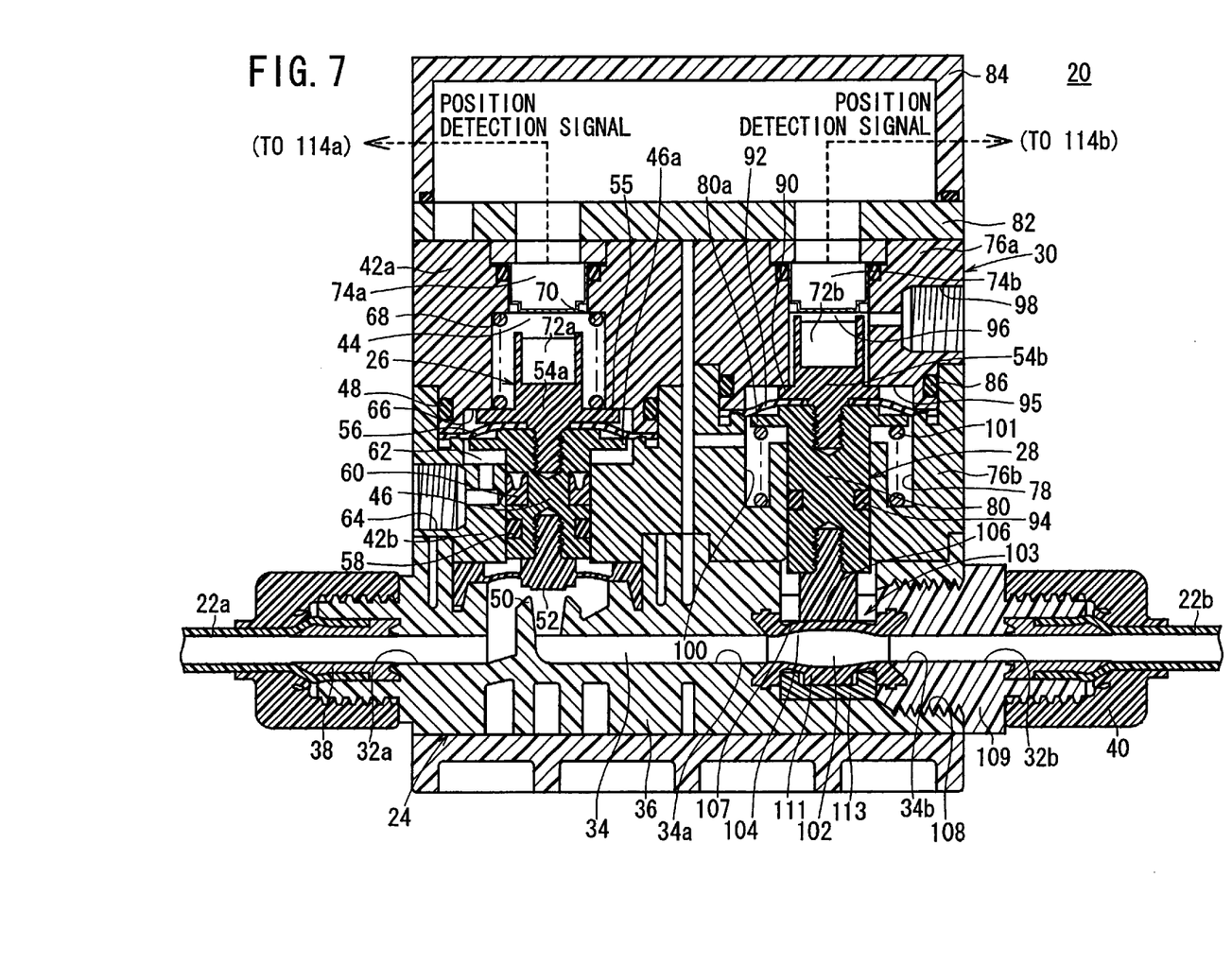
FIG. 7 is a vertical sectional view illustrating the operation of the suck back valve shown in FIG. 1.

As shown in FIG. 7, the displacement in the upward direction is restricted when a flange section 55 of the first connecting member 54a, which protrudes radially outwardly, abuts against a wall surface 66 of the first upper valve body 42a.

A first spring member 70 is provided in the first chamber 44. The first spring member 70 has one end fastened to the flange section 55 of the first connecting member 54a and the other end fastened to an annular step 68 of the first upper valve body 42a. The first connecting member 54a, the first piston 46, and the valve plug 52 are pressed downwardly by the spring force of the first spring member 70.

A first magnet 72a is installed to a recess which is formed at one end of the first connecting member 54a. The flange section 55 abuts against the wall surface 66 of the first upper valve body 42a, and thus the flange section 55 functions as a stopper to restrict the upward movement of the first piston 46.

A first position detecting sensor 74a such as a Hall effect element to detect the position of the first piston 46 is provided on the first upper valve body 42a which is opposed to the first magnet 72a while being spaced therefrom by a predetermined distance. In this arrangement, when the first position detecting sensor 74a detects the magnetic field of the first magnet 72a installed to one end of the first connecting member 54a, the valve-opened state or the valve-closed state of the ON/OFF valve 26 is detected respectively. The position detection signal can be sent to a first control unit 114a (see FIG. 6) via a lead wire and a connector which are not shown.

The suck back mechanism 28 is arranged on an upper portion of the joint section 24 disposed closely to the second port 32b. The suck back mechanism 28 includes a second upper valve body 76a and a second lower valve body 76b which are connected to the joint body 36, and a second piston (displaceable member) 80 which is arranged in a second chamber 78 formed in the second upper valve body 76a and the second lower valve body 76b and which is displaceable in the vertical direction.

The first upper valve body 42a and the first lower valve body 42b of the ON/OFF valve 26 and the second upper valve body 76a and the second lower valve body 76b of the suck back mechanism 28 are assembled by a bonnet 82 and a cover member 84 which are commonly carried thereon. A second seal member 86 is installed to the connecting portion between the second upper valve body 76a and the second lower valve body 76b. The air-tightness is retained in the second chamber 78 by the sealing function of the second seal member 86.

A second connecting member 54b is fastened to the upper surface of the second piston 80 through a screw section. A second diaphragm 92 is intervened between the second piston 80 and the second connecting member 54b. The second diaphragm 92 is thin-walled and flat plate-shaped and has the circumferential edge interposed between the second upper valve body 76a and the second lower valve body 76b. An O-ring 94 is installed to an annular groove on the outer circumferential surface of the second piston 80. As shown in FIG. 7, when a flange section 90 of the second connecting member 54b, which protrudes radially outwardly, abuts against a wall surface 95 of the second upper valve body 76a, the upward displacement is restricted. A second magnet 72b is installed to a recess formed at one end of the second connecting member 54b.

A second position detecting sensor 74b such as a Hall effect element to detect the position of the second piston 80 is provided on the second upper valve body 76a which is opposed to the second magnet 72b while being spaced therefrom by a predetermined distance. In this arrangement, when the second position detecting sensor 74b detects the magnetic field of the second magnet 72b installed to one end of the second connecting member 54b, the displacement of the second piston 80 is detected respectively. The position detection signal can be sent to a second control unit 114b (see FIG. 6) via a lead wire and a connector which are not shown.

A diaphragm chamber 96, which is closed by the second diaphragm 92 in an air-tight manner, is formed over the second diaphragm 92. The pressure fluid (pilot pressure) is supplied to the diaphragm chamber 96 via a second pressure fluid inlet/outlet port 98 which is communicated with the diaphragm chamber 96.

An annular groove 100 is formed under the second diaphragm 92. The annular groove 100 has a diameter larger than the diameter of the second piston 80. A second spring member 101 for pressing the second piston 80 upwardly is arranged in the annular groove 100. The second spring member 101 has one end fastened to a flange section 80a of the second piston 80 and the other end fastened to the bottom surface of the annular groove 100.

A volume-varying mechanism 103 is provided under the second piston 80. The volume-varying mechanism 103 increases or decreases the volume of a flow chamber 102 communicating with the fluid passage 34.

Figure 2:
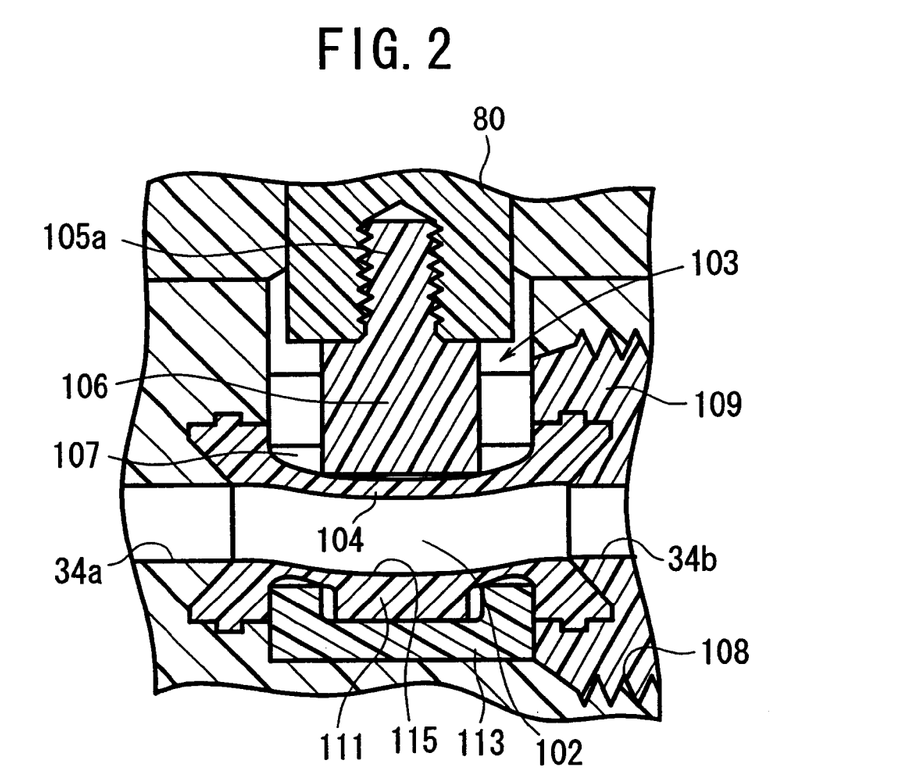
FIG. 2 is a partial magnified vertical sectional view illustrating a volume-varying mechanism of the suck back valve shown in FIG. 1.
Figure 3:
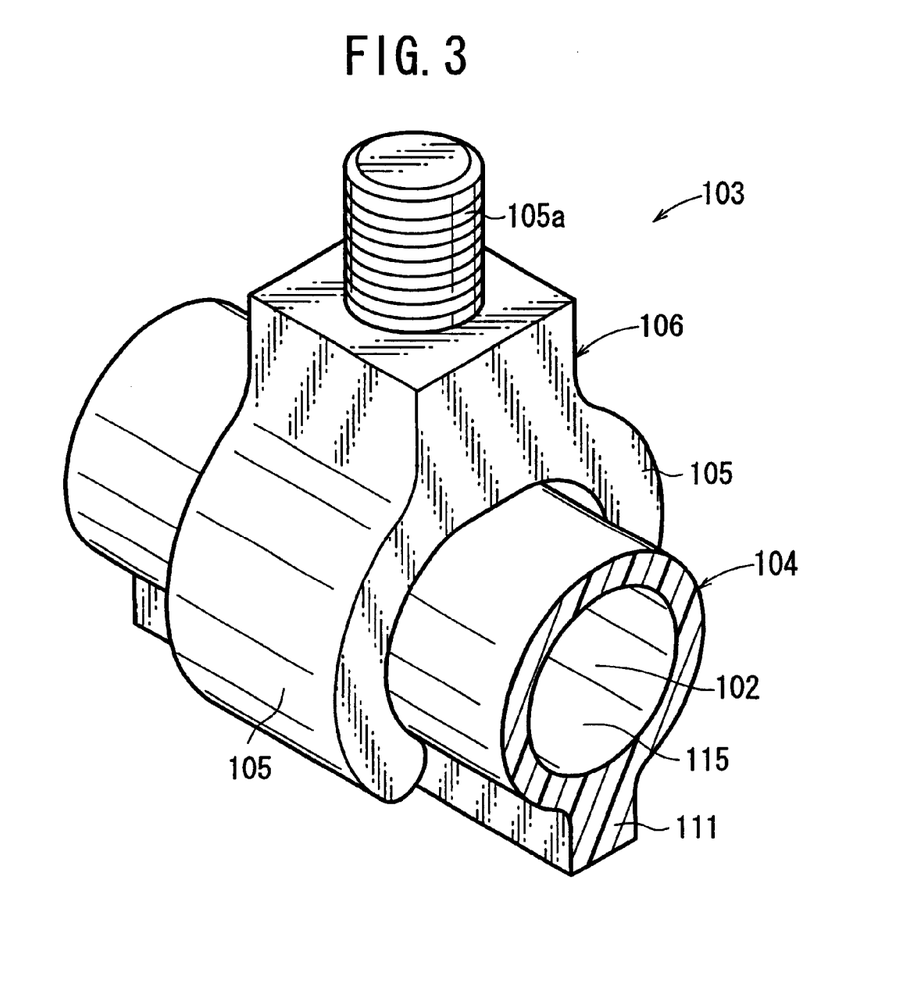
FIG. 3 is, with partial cross section, a perspective view illustrating the volume-varying mechanism.

As shown in FIG. 2, the volume-varying mechanism 103 includes a cylindrical flexible member 104 which is installed substantially coaxially between the divided fluid passages 34a, 34b and which is formed with the flow chamber 102 communicated with the respective divided fluid passages 34a, 34b, and a hook member (stretching member) 106 which has a sleeve 105 (see FIG. 3) having a substantially circular arc-shaped cross section surrounding a part of the outer circumferential surface of the cylindrical flexible member 104. The hook member 106 is connected to a lower portion of the second piston 80 through a screw section 105a.

Figure 4:
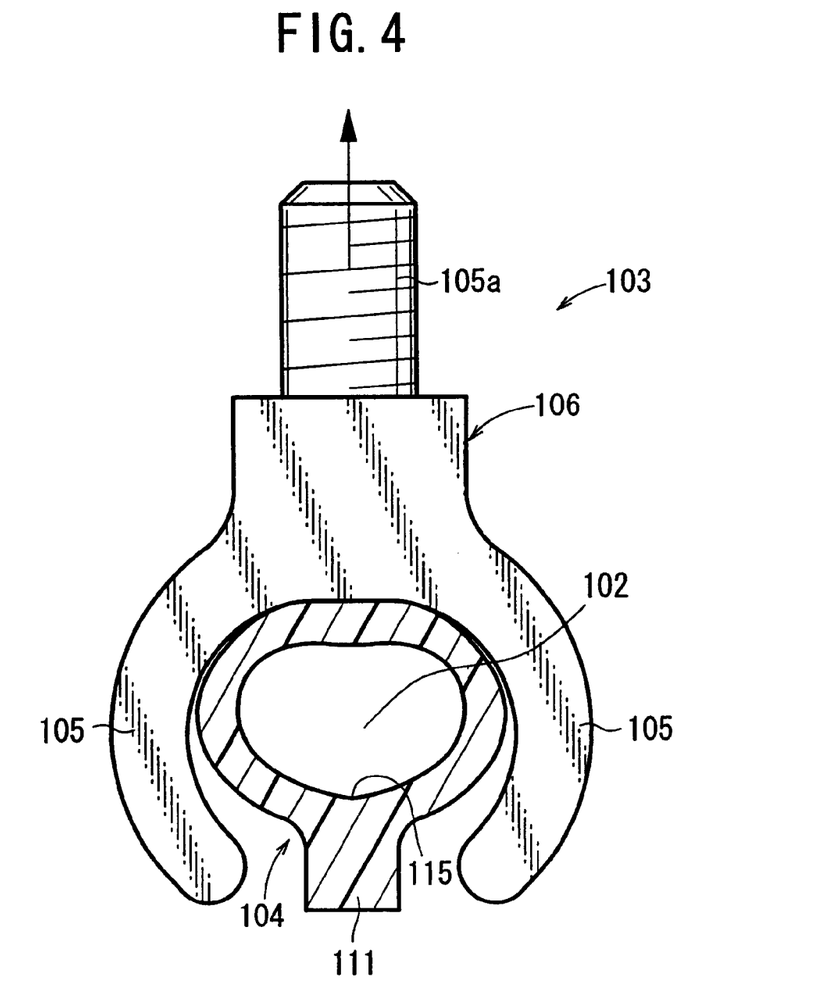
FIG. 4 is, with partial cross section, a front view illustrating the volume-varying mechanism.

In this arrangement, as shown in FIG. 4, the maximum inner diameter of the sleeve 105 of the hook member 106 in the horizontal direction is larger than the maximum outer diameter of the cylindrical flexible member 104 in the horizontal direction. The distance between forward end portions of the sleeve 105 is smaller than the maximum outer diameter of the cylindrical flexible member 104 in the horizontal direction.

As shown in FIG. 2, the cylindrical flexible member 104 is arranged in a cutout recess 107 of the joint body 36. One end of the cylindrical flexible member 104 is secured to the joint body 36, and the other end is secured to a fitting member 109 which is fitted to a recess 108 of the joint body 36. A ridge 111 is formed at a lower portion of the cylindrical flexible member 104 and extends in the axial direction. The ridge 111 is fixed by a fixing member 113 which is secured to the recess 107. The cylindrical flexible member 104 is preferably formed of a resin material such as tetrafluoroethylene/perfluoroalkyl vinyl ether copolymer (PFA) or polytetrafluoroethylene (PTFE).

Figure 5:
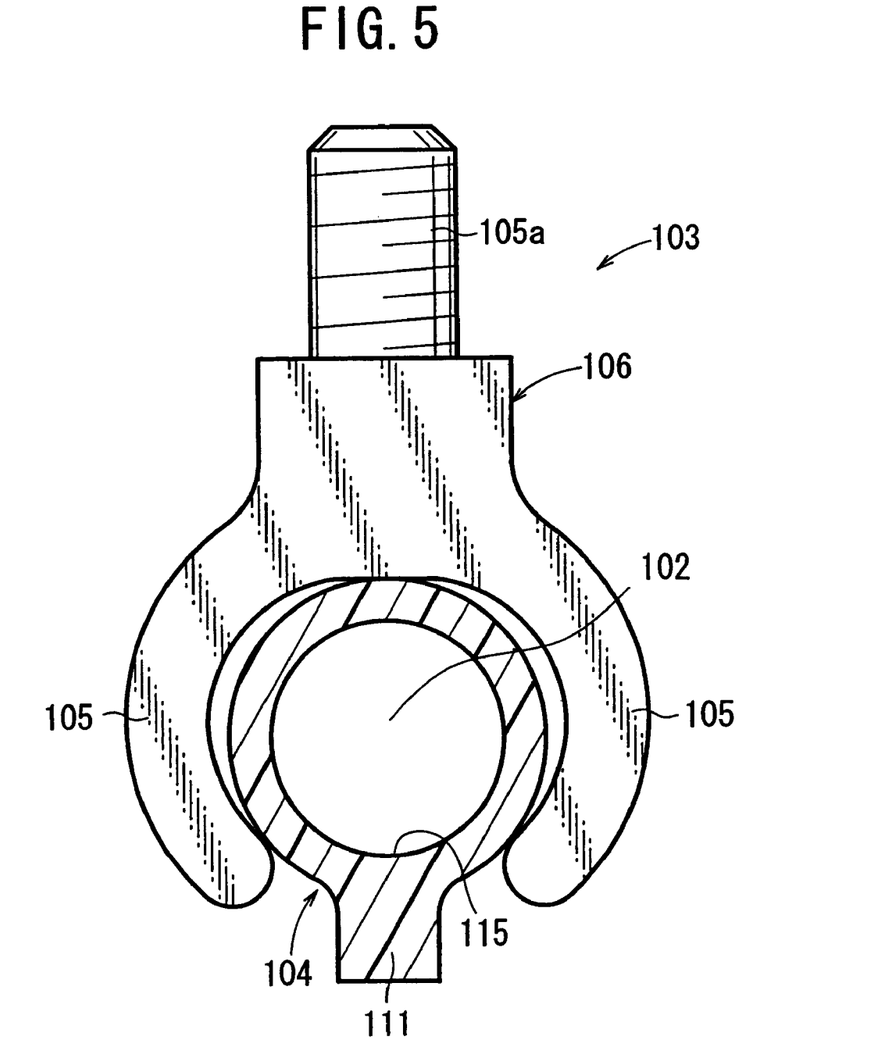
FIG. 5 is, with partial cross section, a front view in which a hook member of the volume-varying mechanism is moved upwardly from a state shown in FIG. 4 to increase the volume of a flow chamber formed in a cylindrical flexible member.

The flow chamber 102 is formed in the cylindrical flexible member 104. The flow chamber 102 has, in the axial direction, one end and the other end which are communicated with the fluid passage 34a having the first port 32a and the fluid passage 34b having the second port 32b respectively. When the hook member 106 is moved upwardly together with the second piston 80, the ends of the sleeve 105 having the substantially circular arc-shaped cross section are engaged with part of the outer circumferential surface of the cylindrical flexible member 104. Thus, the upper portion of the cylindrical flexible member 104 is pulled upwardly (see FIG. 4). When the sleeve 105 of the hook member 106 is moved upwardly as described above, part of the outer circumferential surface of the cylindrical flexible member 104 is stretched upwardly. Then, the cylindrical flexible member 104 is deformed and expanded, and the volume of the flow chamber 102 formed therein is increased (see FIG. 5).

When the cross-sectional shape of the lower portion in the flow chamber 102 has a curved surface 115 (see FIG. 2), the volume of the flow chamber 102 can be greatly changed advantageously.

In this arrangement, the pressure fluid supplied into the diaphragm chamber 96 via the second pressure fluid inlet/outlet port 98, acts on the upper surface of the second diaphragm 92, and it presses the second diaphragm 92 downwardly. Therefore, the second piston 80 is displaced downwardly together with the hook member 106 against the spring force of the second spring member 101. The sleeve 105 of the hook member 106 presses the cylindrical flexible member 104 downwardly, in which the volume of the flow chamber 102 is decreased.

The suck back valve 20 of the embodiment according to the present invention is basically constructed as described above. Next, its operation, function, and effect will be explained.

Figure 6:
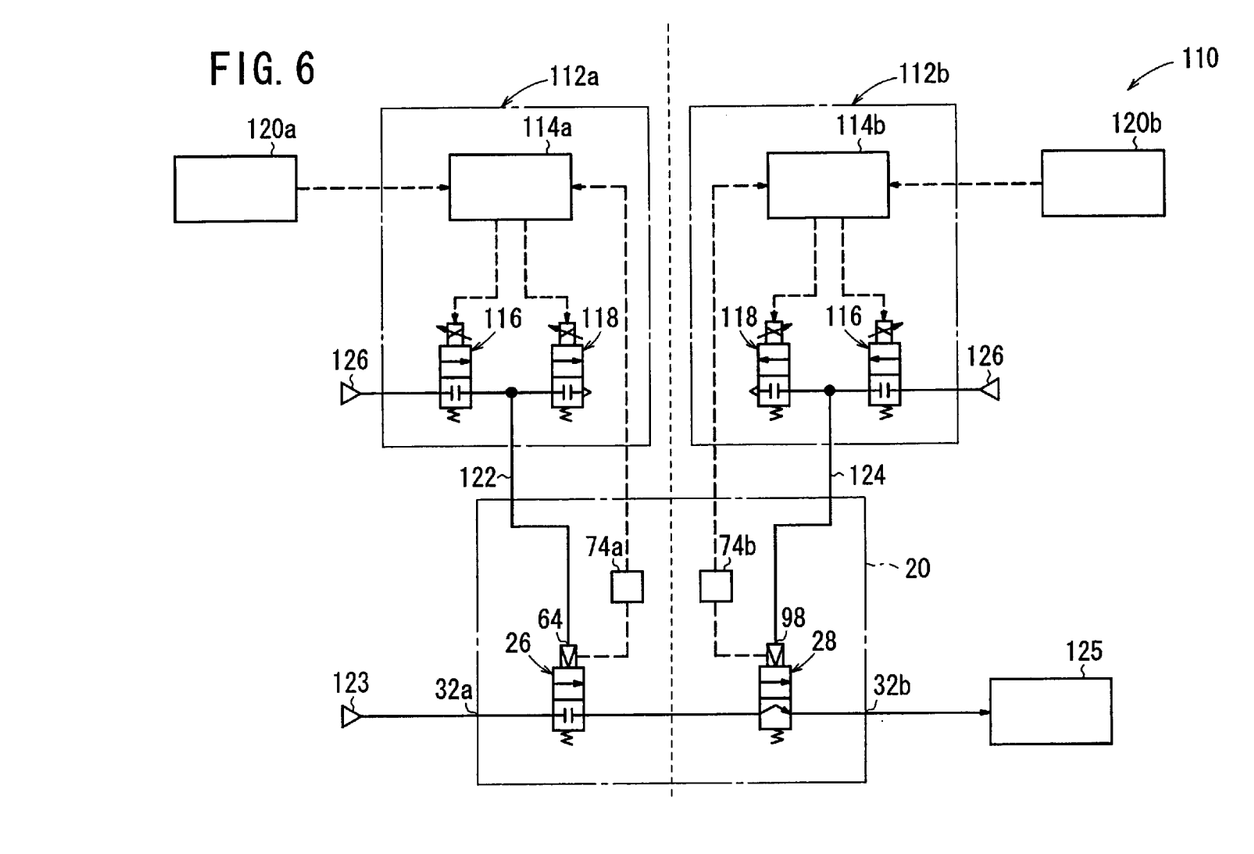
FIG. 6 is a schematic block diagram illustrating a suck back system into which the suck back valve shown in FIG. 1 is incorporated.

FIG. 6 shows a suck back system 110 into which the suck back valve 20 according to the embodiment of the present invention is incorporated.

The suck back system 110 is provided with first and second electropneumatic proportional valves 112a, 112b each of which has substantially the same structure and outputs pneumatic pressure signals corresponding to inputted electric signals. The first and second electropneumatic proportional valves 112a, 112b include first and second control units (control means) 114a, 114b respectively, and supply solenoid-operated valves 116 and discharge solenoid-operated valves 118 which are of the normally closed type and which are energized and deenergized based on command signals (ON signal/OFF signal) outputted from the first and second control units 114a, 114b respectively. First and second data-setting means 120a, 120b are connected to the first and second electropneumatic proportional valves 112a, 112b, respectively, and send setting signals to the first and second control units 114a, 114b.

In this arrangement, a passage 122 is connected to the first pressure fluid inlet/outlet port 64 of the ON/OFF valve 26. The passage 122 is branched from a communication passage between the supply solenoid-operated valve 116 and the discharge solenoid-operated valve 118 of the first electropneumatic proportional valve 112a. On the other hand, a passage 124 is connected to the second pressure fluid inlet/outlet port 98 of the suck back mechanism 28. The passage 124 is branched from a communication passage between the supply solenoid-operated valve 116 and the discharge solenoid-operated valve 118 of the second electropneumatic proportional valve 112b.

Unillustrated MPUs (MPU: microprocessor unit) are provided in the first and second control units 114a, 114b. The MPUs function as respective means for control, judgment, process, calculation, and storage. The supply solenoid-operated valve 116 and/or the discharge solenoid-operated valve 118 is energized or deenergized based on the control signal from MPU. Accordingly, the pilot pressure is controlled, which is supplied to the cylinder chamber 62 of the ON/OFF valve 26 and the diaphragm chamber 96 of the suck back mechanism 28 respectively.

The first position-detecting sensor 74a of the ON/OFF valve 26 is electrically connected to the first control unit 114a. The position detection signal of the first position-detecting sensor 74a is sent to the first control unit 114a. On the other hand, the second position-detecting sensor 74b of the suck back mechanism 28 is electrically connected to the second control unit 114b. The position detection signal of the second position-detecting sensor 74b is sent to the second control unit 114b.

A coating liquid supply source 123, in which the coating liquid is stored, is connected to the tube 22a which is communicated with the first port 32a of the suck back valve 20. On the other hand, a coating liquid-dripping apparatus 125 provided with a nozzle for dripping the coating liquid toward an unillustrated semiconductor wafer is in advance connected to the tube 22b which is communicated with the second port 32b.

After preparatory operation as described above, the pressure fluid supply source 126 is energized to flow the pressure fluid into the first and second electropneumatic proportional valves 112a, 112b. Further, setting signals are sent to the first and second control units 114a, 114b by the data-setting means 120a, 120b. The first control unit 114a sends the energizing signal to only the supply solenoid-operated valve 116 based on the setting signal so that the supply solenoid-operated valve 116 is turned on (the ON state). In this situation, the discharge solenoid-operated valve 118 is deenergized, and it is in the OFF state. Therefore, the pilot pressure into the ON/OFF valve 26 by the supply solenoid-operated valve 116 is supplied to the cylinder chamber 62 to move the first piston 46 upwardly. Accordingly, the ON/OFF valve 26 is turned on (the ON state).

During this process, the first position-detecting sensor 74a detects the magnetic field of the first magnet 72a installed to one end of the first piston 46. The position detection signal from the first position-detecting sensor 74a is sent to the first control unit 114a. Accordingly, the first control unit 114a confirms that the ON/OFF valve 26 is in the ON state.

On the other hand, the second control unit 114b sends the energizing signal to only the supply solenoid-operated valve 116 based on the setting signal so that the supply solenoid-operated valve 116 is turned on (the ON state). In this situation, the discharge solenoid-operated valve 118 is deenergized, and it is in the OFF state. Therefore, the pilot pressure in the suck back mechanism 28 through the supply solenoid-operated valve 116 is supplied to the diaphragm chamber 96 to press the second diaphragm 92. Accordingly, the second piston 80 and the hook member 106 are displaced downwardly against the spring force of the second spring member 101, and then the curved sleeve 105 of the hook member 106 presses the cylindrical flexible member 104 downwardly.

During this process, the second position-detecting sensor 74b detects the magnetic field of the second magnet 72b which is installed to one end of the second piston 80. The position detection signal from the second position-detecting sensor 74b is sent to the second control unit 114b. Accordingly, the second control unit 114b confirms that the second piston 80 and the hook member 106 are displaced downwardly.

The ON/OFF valve 26 is in the ON state and the volume of the flow chamber 102 of the cylindrical flexible member 104 is decreased under the pressing action of the sleeve 105 of the hook member 106 as described above. In this state, the coating liquid supplied from the coating liquid supply source 123 flows through the fluid passages 34 and the flow chamber 102, and is dripped to the semiconductor wafer by the coating liquid-dripping apparatus 125. As a result, a coating film (not shown) having a desired film thickness is formed on the semiconductor wafer.

After the predetermined amount of the coating liquid is applied to the unillustrated semiconductor wafer by the coating liquid-dripping apparatus 125, the supply solenoid-operated valve 116 and/or the discharge solenoid-operated valve 118 is appropriately energized or deenergized in accordance with the control signal from an unillustrated MPU of the first control unit 114a. Accordingly, the pilot pressure supplied to the cylinder chamber 62 of the ON/OFF valve 26 is decreased so that the ON/OFF valve 26 is turned off (the OFF state).

That is, when the pilot pressure supplied to the cylinder chamber 62 of the ON/OFF valve 26 is decreased to be zero, then the first piston 46 is displaced downwardly by the spring force of the first spring member 70, and the valve plug 52 is seated on the seat section 50. The first position-detecting sensor 74a detects the magnetic field of the first magnet 72a which is displaced together with the first piston 46, and the position detection signal is sent to the first control unit 114a. Accordingly, the first control unit 114a confirms that the ON/OFF valve 26 is in the OFF state.

Therefore, when the ON/OFF valve 26 is in the OFF state to shut off the fluid passage 34, the supply of the coating liquid to the semiconductor wafer is stopped, that is, the dripping of the coating liquid onto the semiconductor wafer from the unillustrated nozzle of the coating liquid-dripping apparatus 125 is also stopped. In this situation, the coating liquid, which is about to be dripped to the semiconductor wafer, remains in the nozzle of the coating liquid-dripping apparatus 125. Therefore, a liquid drip may occur.

Accordingly, the second control unit 114b send the deenergizing signal to the supply solenoid-operated valve 116 of the second electropneumatic proportional valve 112b to turn off the supply solenoid-operated valve 116 (the OFF state), and simultaneously the energizing signal is sent to the discharge solenoid-operated valve 118 to turn on the discharge solenoid-operated valve 118 (the ON state).

Therefore, when the supply of the pilot pressure is stopped for the diaphragm chamber 96 of the suck back mechanism 28, and the pilot pressure in the diaphragm chamber 96 is decreased to be zero, then the second piston 80 is moved upwardly by the spring force of the second spring member 101. When the upper surface of the second connecting member 54b, which is displaced together with the second piston 80, abuts against the wall surface 128 formed on the second upper valve body 76a, the displacement in the upward direction is restricted.

Figure 8:
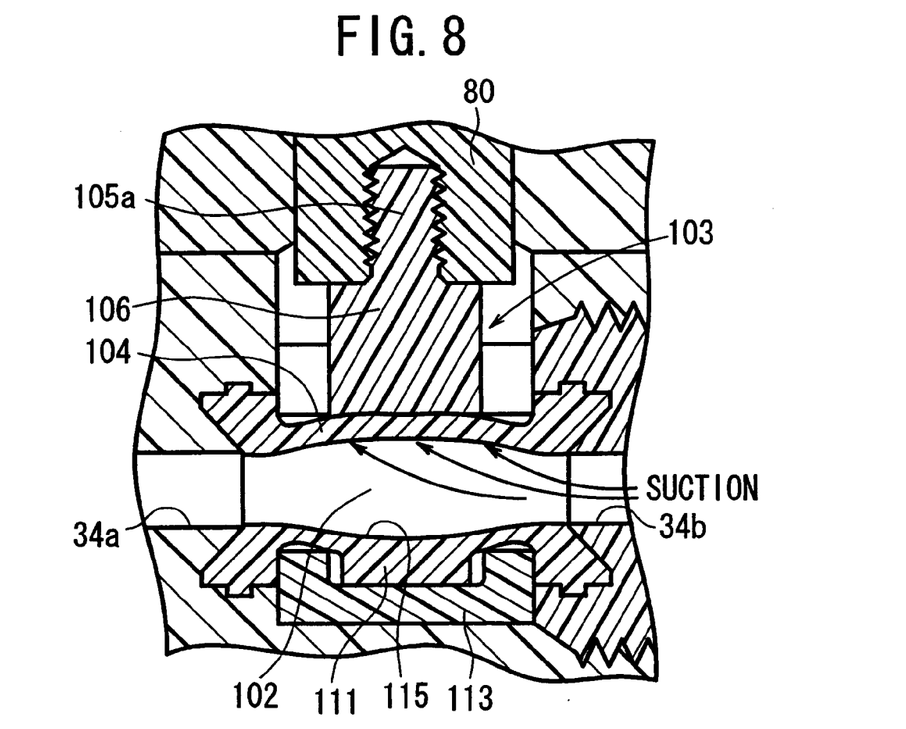
FIG. 8 is a partial magnified vertical sectional view illustrating the suck back valve shown in FIG. 7.

As a result, the hook member 106 connected to one end of the second piston 80 is moved in the upward direction. Accordingly, the ends of the sleeve 105 having the substantially circular arc-shaped cross section are engaged with part of the outer circumferential surface of the cylindrical flexible member 104, and the upper portion of the cylindrical flexible member 104 is pulled upwardly (see FIGS. 4 and 7). When the sleeve 105 of the hook member 106 is moved upwardly, part of the outer circumferential surface of the cylindrical flexible member 104 are pulled up, and the cylindrical flexible member 104 is deformed and expanded, then the volume of the flow chamber 102 formed therein is increased to generate negative pressure. During this process, a predetermined amount of the coating liquid in the fluid passage 34b is sucked in accordance with the increase of the flow chamber 102 (see FIG. 8). As a result, the predetermined amount of the coating liquid remaining in the nozzle of the coating liquid-dripping apparatus 125 is sucked toward the suck back valve 20. Accordingly, it is possible to avoid a liquid drip to the semiconductor wafer.

When the pilot pressure is decreased and the second spring member 101 is moved upwardly, then the second position-detecting sensor 74b detects the magnetic field of the second magnet 72b which is installed to one end of the second connecting member 54b. The position detection signal from the second position-detecting sensor 74b is sent to the second control unit 114b.

The energizing signal is sent from the first control unit 114a to turn on the ON/OFF valve 26 (the ON state), and simultaneously the energizing signal is sent from the second control unit 114b to the supply solenoid-operated valve 116 to turn on (the ON state), and the deenergizing signal is sent to the discharge solenoid-operated valve 118 to turn off (the OFF state). Thus, turning back to the initial state, the dripping of the coating liquid to the semiconductor wafer is started.

In the embodiment of the present invention, the cylindrical flexible member 104 is installed between the divided fluid passages 34a, 34b to fix the ridge 111 of the cylindrical flexible member 104. The outer circumferential surface of the cylindrical flexible member 104 is pulled up by the sleeve 105 of the hook member 106 which engages with part of the outer circumferential surface of the cylindrical flexible member 104. Accordingly, the cylindrical flexible member 104 is deformed and expanded. Therefore, the predetermined amount of the coating liquid remaining in the nozzle is sucked toward the suck back valve 20 by increasing the volume of the flow chamber 102 formed in the cylindrical flexible member 104. Thus, a liquid drip to the semiconductor wafer is avoided.

As described above, in the embodiment of the present invention, the cylindrical flexible member 104 is installed at the intermediate portion between the divided fluid passages 34a, 34b, and the coating liquid is sucked by increasing the volume of the flow chamber 102 formed in the cylindrical flexible member 104. Therefore, in the embodiment of the present invention, there is not any stepped structure or the like in the flow chamber 102 of the cylindrical flexible member 104 through which the coating liquid flows. Therefore, it is possible to avoid the appearance of any liquid pool and the accumulation of dust or the like.

Further, in the embodiment of the present invention, the suction amount is set by increasing or decreasing the volume of the flow chamber 102 formed in the cylindrical flexible member 104. Therefore, it is possible to set the range of the suction amount variously. Further, for example, it is also possible to set an extremely minute suction amount.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A suck back valve comprising:
    a main body provided with fluid passage for communicating with a first port formed at one end and a second port formed at the other end;
    an ON/OFF valve which opens/closes said fluid passage as a valve plug is displaced;
    a flexible member provided between said first port and said second port of said fluid passage, a flow chamber being formed in said flexible member for connecting said fluid passage having said first port with said fluid passage having said second port;
    a fixing member for fixing a part of an outer circumferential surface of said flexible member to said main body;
    a stretching member for increasing a volume of said flow chamber by expanding and deforming said outer circumferential surface of said flexible member; and
    a displaceable member which is connected to said stretching member for displacing said stretching member,
    wherein a pressure fluid in said fluid passage is sucked under a negative pressure of said flexible member.

2. The suck back valve according to claim 1, wherein said stretching member comprises a hook member which has a sleeve having a circular arc-shaped cross section for engaging with said outer circumferential surface of said cylindrical flexible member.

3. The suck back valve according to claim 1, wherein said flexible member is arranged in a recess formed by cutting out said main body, and said flexible member has one end secured on said main body and the other end secured on a fitting member fitted to a hole of said main body.

4. The suck back valve according to claim 1, wherein a ridge extending in an axial direction is formed on a lower portion of said outer circumferential surface of said flexible member, and said ridge is fixed to said fixing member.

5. The suck back valve according to claim 2, wherein a maximum inner diameter of said sleeve of said hook member in a horizontal direction is larger than a maximum outer diameter of said flexible member in said horizontal direction, and a distance between ends of said sleeve is smaller than said maximum outer diameter of said flexible member in said horizontal direction.

6. The suck back valve according to claim 1, wherein said displaceable member comprises a piston which is displaceable under a pilot pressure, and said stretching member is operated together with said piston.

7. The suck back valve according to claim 1, wherein said main body is provided with a first position-detecting sensor for detecting a position of a first piston which is displaceable together with said valve plug of said ON/OFF valve, and a second position-detecting sensor for detecting a position of said displaceable member.

8. The suck back valve according to claim 7, further comprising a first electropneumatic proportional valve which is provided with a first control unit for receiving a position detection signal from said first position-detecting sensor, and a second electropneumatic proportional valve which is provided with a second control unit for receiving a position detection signal from said second position-detecting sensor, wherein a suck back system is constructed by said first electropneumatic proportional valve and said second electropneumatic proportional valve.

* * * * *